United States Patent [19]

Sprague

[11] Patent Number: 4,971,474

[45] Date of Patent: Nov. 20, 1990

[54] QUICK CONNECT COUPLING

[75] Inventor: Benny B. Sprague, Pasadena, Tex.

[73] Assignee: The United States of America as represented by the Administrator of the National Aeronautics and Space Administration, Washington, D.C.

[21] Appl. No.: 503,410

[22] Filed: Mar. 30, 1990

[51] Int. Cl.⁵ ............................ B25G 3/00; F16B 1/00
[52] U.S. Cl. ..................................... 403/331; 285/327; 403/327; 403/317; 403/381
[58] Field of Search ....................... 285/327, 325, 326; 403/317, 331, 327, 381; 292/333

[56] References Cited

U.S. PATENT DOCUMENTS

| | | | |
|---|---|---|---|
| 742,598 | 10/1903 | Costello, Jr. et al. | 403/327 |
| 779,479 | 1/1905 | Howell . | |
| 1,427,402 | 8/1922 | Malec . | |
| 4,274,181 | 6/1981 | Schaller | 24/201 A |
| 4,340,318 | 7/1982 | Frosch | 403/331 X |
| 4,613,112 | 9/1986 | Phlipot et al. | 251/149.6 |
| 4,645,373 | 2/1987 | Purdy | 403/381 X |

Primary Examiner—Andrew V. Kundrat
Attorney, Agent, or Firm—Russell E. Schlorff; John R. Manning; Edward K. Fein

[57] ABSTRACT

A coupling device has a transversely arranged, open-end groove (30) in a flange attached to a pipe end. The groove in the flange receives a circumferentially arranged locking flange element (76) on the other coupling member and permits alignment of the bores of the coupling members when the locking flange element is in the open end groove. Upon alignment of the bores of the coupling members, a trigger member (60) is activiated to automatically release a spring biased tubular member (33) in one of the coupling members. The tubular member has a conical end (48) which is displaced into the other coupling member to lock the coupling members to one another. A tensioning nut (72) is threadedly movable on a coupling member so as to be moved into tightening engagement with the other coupling member.

8 Claims, 2 Drawing Sheets

QUICK CONNECT COUPLING

ORIGIN OF THE INVENTION

The invention described herein was made by an employee of the U.S. Government and may be manufactured and used by or for the Government of the United States of America for governmental purposes without the payment of any royalties thereon or therefor.

FIELD OF THE INVENTION

This invention relates to quick coupling or quick connect devices, and more particularly to an automatically actuated coupling system for interconnecting tubular members to one another in an end-to-end relationship which has particular usefulness for quickly interconnecting tubular members.

BACKGROUND OF THE INVENTION

Truss members used in space operations principally are designed to carry axial loads. In a space station, truss members will be connected end-to-end and require a simply operated self-aligning connector device which can be utilized for interconnecting and locking the truss members to one another. End-to-end connectors have a wide variety of applications where speed and simplicity are important.

Typical connector devices for use in earth environments are disclosed in the following patents.

U.S. Pat. No. 4,613,112 to Philpot discloses a concept of a quick disconnect tubular fitting for a female coupling where the coupling has a spring and piston arrangement and provides a pressure fitting. The male connector is locked in place by a flat plate member which is spring biased to a locking condition.

U.S. Pat. No. 4,274,181 to Schaller discloses a coupling arrangement where a hollow catch member slides over a post head member so that a spring can force a plunger in the catch member into locking engagement with a cylindrical opening in the post head member.

U.S. Pat. No. 1,427,402 to Malec discloses a threaded coupling for interconnecting end-to-end tubular members. A slidable plunger rod with a tapered end is spring biased to a position within both tubular members to provide reinforcing.

U.S. Pat. No. 779,479 to Howell discloses coupling members with a transverse interfitting arrangement which splices the members to one another in a transverse direction. A spring biased locking sleeve interconnects with the central bores of the members upon assembly to lock the members to one another. A slot and pin permit disengagement of the locking sleeve from the members for release purposes.

SUMMARY OF THE INVENTION

In the coupling device of the present invention, one coupling member has a transversely arranged, open-end groove in a flange attached to a pipe end. The groove in the flange receives a circumferentially arranged locking flange element on the other coupling member and permits alignment of the bores of the coupling members when the locking flange element is in the open end groove. Upon alignment of the bores of the coupling members, a trigger member is activated to automatically release a spring biased tubular member in one of the coupling members. The tubular member has a conical end which is displaced into the other coupling member to lock the coupling members to one another. A tensioning nut is threadedly movable on a coupling member so as to be moved into tightening engagement with the other coupling member.

The device can be disconnected by releasing the tensioning nut and moving an exteriorly accessible pin in a slot to reset the spring biased tubular member and permit disconnection of the coupling members from one another.

DESCRIPTION OF THE INVENTION

Figure 1:
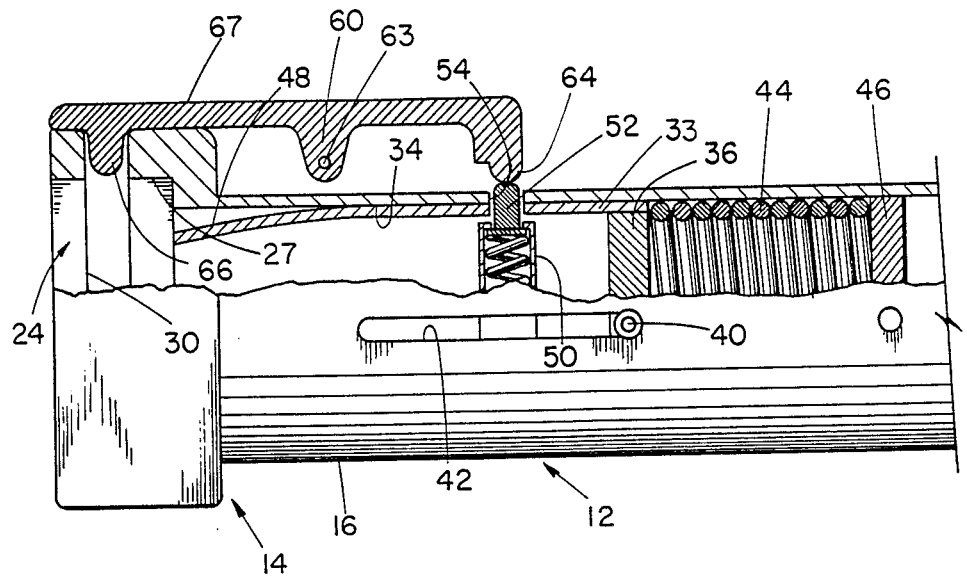
FIG. 1 is a view in partial longitudinal cross section through one coupling member showing the parts in a position prior to coupling of the coupling members.

Referring now to the drawings, a coupling device for truss members in a space station is illustrated where the coupling device includes an interconnecting male tubular member 10 (FIG. 2) and a female tubular member 12 (FIG. 1). The female coupling member 12 is provided with an open ended coupling flange 14 at a terminal end. The coupling flange 14 has a general U-shaped configuration in cross section perpendicular to its central axis and is attached to a tubular pipe member 16. The coupling flange 14 has a semicylindrical outer surface portion 18 which extends for 180° about a central axis 20 for the tubular member 16 and has parallel outer side portions 21,22. (See FIG. 3). The U-shaped coupling flange 14 is generally transverse to the axis 20. The coupling flange 14 has a generally U-shaped internal recess 24 which has outwardly diverging side surfaces 25,26 connected to a semi-cylindrical surface 27. The inner semi-cylindrical surface 27 of the recess 24 of the coupling flange is provided with a locking groove 30. The groove 30 has a U-shaped or rectangular cross section and which extends for 180° around the axis 20 of the opening of the tubular coupling member 16 and parallel sides 31,32 which extend along the side portions 21,22.

A longitudinally movable tubular locking or cylinder member 33 is slidably received within the interior bore 34 of the tubular member 16. At one end of the tubular locking member 33 is a solid circular plate 36. Member 36 fits in the inside diameter of member 33 and is attached to member 33 permanently. (See FIG. 3). Member 36 contains a radially extending bolt or pin 40 through slot 42 in the tubular member 16. The bolt or pin 40 limits the longitudinal travel of the member 33 relative to the tubular member 16. An internal spring 44 is located between an internal stop member 46 in the tubular member 16 and member 36 to normally bias member 36 and the locking member 33 toward an extended position outwardly relative to the tubular coupling member 16. The other end of the locking member 33 is provided with a conically tapered section 48 which cooperates with the bore of a male coupling member as will be described hereinafter.

Within the tubular locking member 33 and intermediate of its length is a cross member 50 which is attached to the wall of the locking member 33 and which contains a radially movable, spring biased detent member 52 which is spring biased radially outward relative to the locking member 33.

As illustrated in FIG. 1, the spring biased detent member 52 extends through and engages an opening 54 in the locking member 33 and in the tubular member 16 and retains the locking member 33 in a retracted position where the spring 44 is compressed. An elongated, plate-shaped, trigger member 60 extends longitudinally of the tubular member 16 and is located in a lengthwise extending slot 62 (see FIG. 3) on the tubular member 16. The trigger member 60 is pivotally coupled midway of its length to the tubular member 16 at a location marked 63. One tab end portion 64 of the trigger member 60, in a first position, is located above the end of the spring biased detent member 52 in the tubular member 16 while a depending tab portion 66 at the other end of the trigger member extends through an opening in the flange so that the tab end portion 66 is disposed within the U-shaped groove 30 in the flange. (See FIG. 1). In the position of the trigger member 60 as shown in FIG. 1, the trigger member has an outer upper surface 67 which is flush or level with an outer surface 68 of the tubular member.

Figure 2:
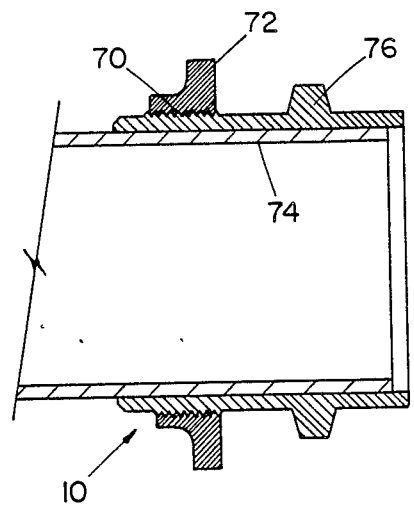
FIG. 2 is a view in partial longitudinal cross section through the other coupling member prior to coupling.
Figure 4:
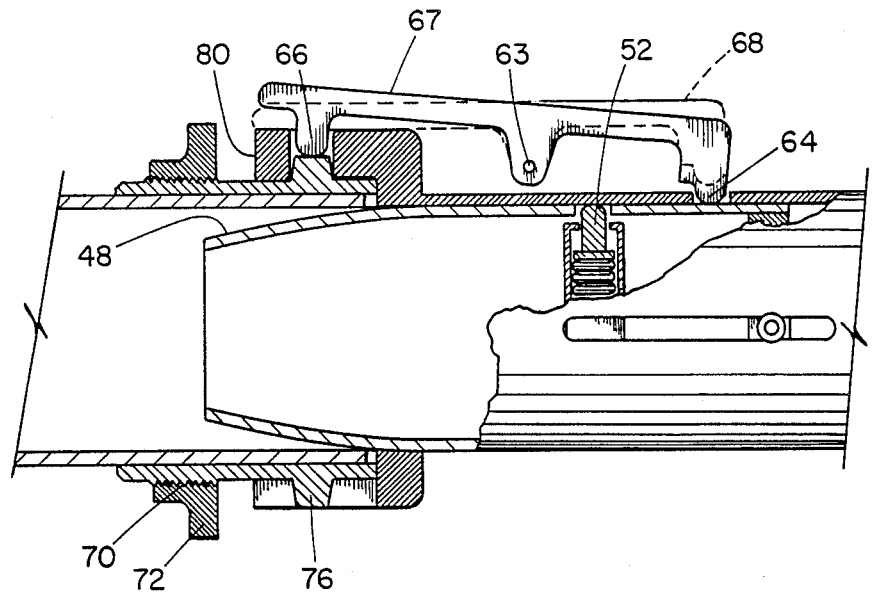
FIG. 4 is a view in partial longitudinal cross section through the coupling members when the members are connected to one another.
Figure 3:
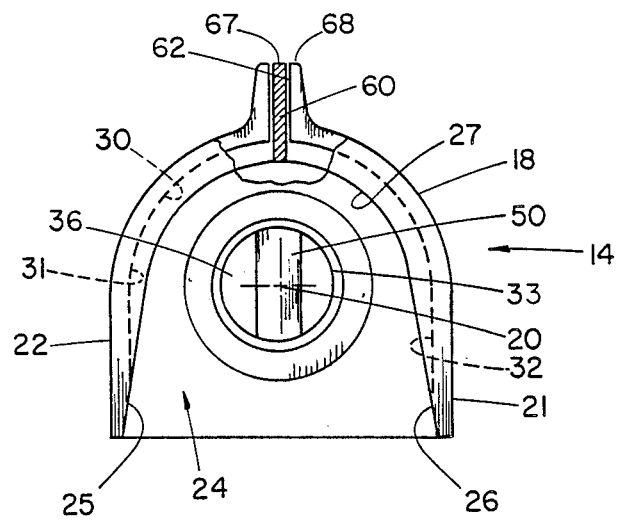
FIG. 3 is an end view of the coupling member of FIG. 1.

A male coupling member 10 is shown in FIG. 2 where a tubular coupling member 10 has an external threaded portion 70 to threadedly receive a locking nut 72. The coupling member 10 has an internal bore 74 sized for a slip fit with the outside diameter of member 33. Tapered nose 48 allows slight misalignment of the male coupling 10 and member 33 during engagement. Around the outer periphery of the male member 10 is a cylindrically shaped triggering flange portion 76 which is sized to fit into the U-shaped groove 30 in the coupling flange. With the nut 72 threaded to a rearward position on the coupling member 10, the triggering flange 76 on the male member can be inserted between the parallel surfaces 31,32 of the U-shaped groove and into the semicylindrical portion of the U-shaped groove 30 by transverse movement of the male coupling member relative to the female member. When the flange 76 engages and moves the finger tab portion 66, the trigger element 60 is pivoted about the pivot 62 and the tab portion 64 on the trigger finger 60 depresses the pin member 52 to release the pin member 52 from the retaining openings 54 in the coupling member 16. When the pin member 52 is released, the locking member 33 is released and the spring 44 forces the locking member 33 to its extended position within the bore 74 of the coupling member 10. As shown in FIG. 4, in a locking position, the locking member 33 is disposed within the bore of both male and female coupling members 10,12 and locks the members 10,12 to one another. The threaded nut member 72 can then be rotated on the male member to bring it into tight engagement with the end surface 80 of the flange 16 and lock the two members 10,12 relative to one another.

To release the coupling between the members 10,12, the locking nut 72 is backed off from its locking position and the bolt member 40 is moved to compress the spring 44 and to shift the locking member 33 from an extended position to a retracted position and the retaining pin 52 once again locks into the retaining opening 54 and resets the trigger member 60 when the male member 10 is removed.

It will be apparent to those skilled in the art that various changes may be made in the invention without departing from the spirit and scope thereof and therefore the invention is not limited by that which is enclosed in the drawings and specifications but only as indicated in the appended claims.

What is claimed is:

1. A coupling device for coupling two tubular members to one another including
    a male tubular coupling part and a female tubular coupling part respectively on said tubular members, said female coupling part having a tubular locking member longitudinally movable between a retracted position and an extended position,
    locking means including a detent member for releasably retaining said locking member in a retracted position,
    trigger means including a longitudinally extending trigger member on said female coupling part for releasing said detent member from a retaining position,
    a flange member on said male coupling part for engaging said female coupling part and for activating said trigger member for releasing said detent member so that said locking member can move to an extended position.

2. The coupling device as set forth in claim 1 and further including slot and pin means on said locking member and said female coupling part for providing exterior access to the pin for moving said locking member relative to said tubular member between the extended and the retracted position.

3. The coupling device as set forth in claim 1 and further including spring means in said female coupling part for resiliently biasing said locking member toward said extended position.

4. The coupling device as set forth in claim 3 wherein said locking member has a conically shaped end portion which is sized for frictional engagement with the bore of the male coupling part.

5. The coupling device as set forth in claim 4 wherein said female tubular coupling part has an internal open-end groove disposed transversely to its central axis and where said open-end groove is sized to receive said flange member.

6. The coupling device as set forth in claim 5 wherein said trigger member is pivotally connected to said female tubular coupling part and, in an uncoupled condition, has one tab element at one end of the trigger member disposed within said open-end groove and another tab element at the other end of the trigger member disposed above said detent member.

7. The coupling device as set forth in claim 6 wherein said locking means includes an opening in said locking member and said female coupling part and said detent member is spring biased into a retaining position in said openings.

8. The coupling device as set forth in claim 5 wherein said male coupling part includes a nut member which is threadedly movable on said male coupling part to engage the end of said female tubular coupling part when said flange member is in said open-end groove for locking the coupling parts to one another.

* * * * *